US012580300B2

(12) United States Patent
Elghannai et al.

(10) Patent No.: US 12,580,300 B2
(45) Date of Patent: Mar. 17, 2026

(54) CIRCULAR POLARIZED SPIRAL ANTENNA FOR HEARING ASSISTANCE DEVICES

(71) Applicant: Starkey Laboratories, Inc., Eden Prairie, MN (US)

(72) Inventors: Ezdeen Elghannai, Eden Prairie, MN (US); Christopher Young, Shorewood, MN (US); Stephen Paul Flood, Eden Prairie, MN (US); Inam Haque, Apple Valley, MN (US); Karl Hilde, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 458 days.

(21) Appl. No.: 17/596,641

(22) PCT Filed: Jul. 2, 2020

(86) PCT No.: PCT/US2020/040658

§ 371 (c)(1),
(2) Date: Dec. 15, 2021

(87) PCT Pub. No.: WO2021/003366

PCT Pub. Date: Jan. 7, 2021

(65) Prior Publication Data

US 2022/0328956 A1 Oct. 13, 2022

Related U.S. Application Data

(60) Provisional application No. 62/870,551, filed on Jul. 3, 2019.

(51) Int. Cl.

*H01Q 1/27* (2006.01)
*H01Q 1/22* (2006.01)

(Continued)

(52) U.S. Cl.

CPC ........... *H01Q 1/273* (2013.01); *H01Q 1/2291* (2013.01); *H01Q 9/27* (2013.01); *H04R 25/554* (2013.01);

(Continued)

(58) Field of Classification Search

CPC ........ H01Q 1/273; H01Q 1/2291; H01Q 9/27; H04B 5/0006; H04R 25/554; H04R 25/60; H04R 2225/51

See application file for complete search history.

(56) References Cited

U.S. PATENT DOCUMENTS

2002/0067315 A1* 6/2002 Kunysz .................. G03F 7/091 343/769
2005/0244024 A1 11/2005 Fischer et al.

(Continued)

FOREIGN PATENT DOCUMENTS

EP 1205009 A1 5/2002
WO WO-2021003366 A1 1/2021

OTHER PUBLICATIONS

Im et al., "A Spiral-Dipole Antenna for MIMO Systems", IEEE Antennas and Wireless Propagation Letters, vol. 7, Jun. 27, 2008, p. 803-806 (Year: 2008).*

(Continued)

*Primary Examiner* — Dameon E Levi
*Assistant Examiner* — Yonchan J Kim
(74) *Attorney, Agent, or Firm* — Schwegman Lundberg & Woessner, P.A.

(57) ABSTRACT

Disclosed herein, among other things, are apparatus and methods for a high-efficiency antenna for hearing assistance device wireless communication. In various embodiments, a hearing assistance device includes a housing, a power source within the housing, and a radio circuit within the housing and electrically connected to the power source. A circular (Continued)

polarized spiral antenna is provided within the housing in various embodiments, the antenna configured to provide two electric field components configured to be used for wireless communications for the hearing assistance device. The device further includes a transmission line connected to a center of a spiral of the antenna and configured to electrically connect to the radio circuit, according to various embodiments.

20 Claims, 7 Drawing Sheets

(51) Int. Cl.
*H01Q 9/27* (2006.01)
*H04R 25/00* (2006.01)
(52) U.S. Cl.
CPC ......... *H04R 25/60* (2013.01); *H04R 2225/51* (2013.01)

(56) References Cited

U.S. PATENT DOCUMENTS

2008/0272980 A1* 11/2008 Adel ........................ H01Q 9/27
343/895
2014/0363037 A1* 12/2014 Nikles .................. H04R 25/554
381/328
2016/0295335 A1* 10/2016 Vajha ................... H04R 25/658
2017/0180884 A1* 6/2017 Ozden .................. H04R 25/554
2020/0244104 A1* 7/2020 Katajamaki .............. H04B 5/79

OTHER PUBLICATIONS

Sharma et al., "Koch fractalized compact spiral antenna based on Fibonacci sequence", 2016 IEEE 5th Asia-Pacific Conference on Antennas and Propagation (APCAP), Jul. 26, 2016, p. 157-158 (Year: 2016).*
"International Application Serial No. PCT/US2020/040658, International Search Report mailed Oct. 13, 2020", 5 pgs.
"International Application Serial No. PCT/US2020/040658, Written Opinion mailed Oct. 13, 2020", 6 pgs.
Sharma, Chetna, et al., "Koch fractalized compact spiral antenna based on Fibonacci sequence", 2016 IEEE 5th Asia-Pacific Conference on Antennas and Propagation (APCAP), IEEE, (Jul. 26, 2016), 157-158.
"International Application Serial No. PCT/US2020/040658, International Preliminary Report on Patentability mailed Jan. 13, 2022", 8 pgs.
"European Application Serial No. 20743530.6, Communication pursuant to Article 94(3) EPC mailed Nov. 21, 2023", 7 pgs.
Im, Yun-Taek, et al., "A Spiral-Dipole Antenna for MIMO Systems", IEEE Antennas and Wireless Propagaton Letters, vol. 7, (2008), 803-806.

* cited by examiner

CIRCULAR POLARIZED SPIRAL ANTENNA FOR HEARING ASSISTANCE DEVICES

CLAIM OF PRIORITY

This patent application is a U.S. National Stage Filing under 35 U.S.C. 371 from International Application No. PCT/US2020/040658, filed on July 2, 2020. which claims the benefit of priority to U.S. Application Ser. No. 62/870, 551, filed Jul. 3, 2019, each of which are incorporated by reference herein in their entirety.

TECHNICAL FIELD

This document relates generally to hearing assistance systems and more particularly to a circular polarized spiral antenna for hearing assistance device wireless applications.

BACKGROUND

Hearing assistance devices, such as hearing aids, are used to assist patients suffering hearing loss by transmitting amplified sounds to ear canals. In one example, a hearing aid is worn in and/or around a patient's ear. Hearing aids may provide adjustable operational modes or characteristics that improve the performance of the hearing aid for a specific person or in a specific environment. Some of the operational characteristics are volume control, tone control, and selective signal input. These and other operational characteristics may be programmed into a hearing aid. A programmable hearing aid may be programmed through wired connections to the hearing aid and by wirelessly communicating with the hearing aid.

Generally, hearing aids are small and require extensive design to fit all the necessary electronic components into the hearing aid or attached to the hearing aid, as is the case for an antenna for wireless communication with the hearing aid.

There is a need in the art for an improved antenna for hearing assistance device wireless communications.

SUMMARY

Disclosed herein, among other things, are apparatus and methods for a high-efficiency antenna for hearing assistance device wireless communication. In various embodiments, a hearing assistance device includes a housing, a power source within the housing, and a radio circuit within the housing and electrically connected to the power source. A circular polarized spiral antenna is provided within the housing in various embodiments, the antenna configured to provide two electric field components configured to be used for wireless communications for the hearing assistance device. In various embodiments, the antenna can be printed on the interior and/or exterior of the housing. The device further includes a transmission line connected to a center of a spiral of the antenna and configured to electrically connect to the radio circuit, according to various embodiments.

Various aspects of the present subject matter include a method of forming a hearing assistance device. The method includes providing a radio circuit and a power source within a housing of the device, and providing a circular polarized spiral antenna within the housing. The antenna is configured to provide two electric field components configured to be used for wireless communications for the hearing assistance device. The method further includes connecting a transmission line to a center of a spiral of the antenna, the transmission line configured to electrically connect to the radio circuit, in various embodiments.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1A:
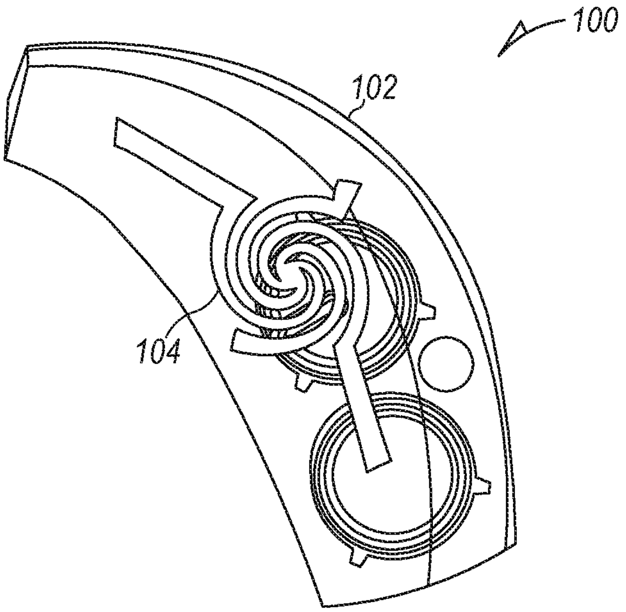
FIG. 1A illustrates a hearing assistance device including a circular polarized spiral antenna, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing assistance devices using the example of hearing aids. Other hearing assistance devices include, but are not limited to, those in this document. It is understood that their use in the description is intended to demonstrate the present subject matter, but not in a limited or exclusive or exhaustive sense.

A hearing assistance device antenna may be used to establish one or more wireless links between the hearing assistance device and handheld devices or other wireless communication devices. In one example, Bluetooth™ Low Energy (BLE) communications are used. Because of size constraints of hearing assistance devices, it may be challenging to design an antenna that can provide effective communications in all directions and orientations, especially when communicating with a handheld device such as a smart phone. In addition to power and distance, antenna polarization also plays a large role in establishing and maintaining a stable and strong wireless connection. Providing an antenna with circular polarization for a specific beam width is desirable for hearing assistance device wireless communications.

The present subject matter provides a circular polarized antenna for hearing assistance device wireless communication. In various embodiments, a spiral antenna, such as a Fibonacci spiral antenna, is used to provide an improved total radiated power for hearing assistance device wireless communication. The present subject matter provides a circular polarized antenna with a desired beam width at the direction of propagation, in various embodiments. The spiral antenna of the present subject matter provides a circular polarization in the direction of field propagation which makes it more immune to changes in orientation of the hearing assistance device, and changes in orientation of an external communication device, such as a smart phone or other devices, in communication with the hearing assistance device. In various embodiments, the spiral antenna of the present subject matter has two field components (vertical and horizontal, for example) and thus may be used simultaneously for multiple stable communication links, such as an ear-to-ear communications link and an ear-to-smart phone communications link. The spiral antenna of the present subject matter may also be used for near- and far-field wireless charging applications to provide flexibility in charging orientation, in various embodiments.

FIG. 1A illustrates a hearing assistance device 100 including a circular polarized spiral antenna 104, according to various embodiments of the present subject matter. In the depicted embodiment, the antenna 104 is on or within a housing 102 of the hearing assistance device 100. The circular polarized antenna 104 may also be located on a surface of the housing 102, integrated with the housing 102 or external to the housing 102, in various embodiments. In various embodiments, the antenna arms are bended based on a Fibonacci/spiral equation. The antenna arms are in a circular direction such that surface current may rotate around the arms and provide 90 degree phase shift which results in two electric field components, such as vertical and horizontal components, in various embodiments. In various embodiments, other elements within the housing include, but are not limited to: batteries, other communication coils (such as a near-field magnetic near-field magnetic induction (NFMI) coil), a receiver, a microphone, hearing aid circuitry such as a flex circuit, an audio processor, memory, mechanical elements and/or sensors.

Figure 1B:
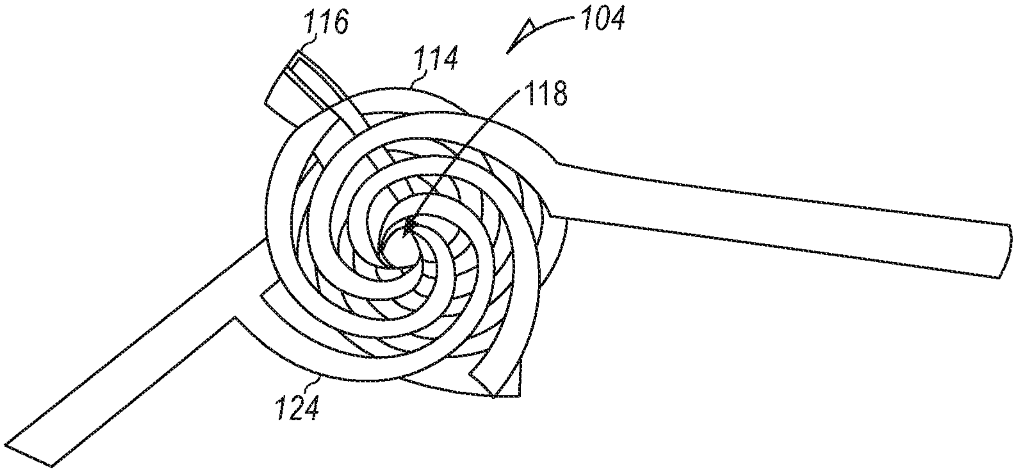
FIGS. 1B-1C illustrate a circular polarized spiral antenna, according to various embodiments of the present subject matter.
Figure 1C:
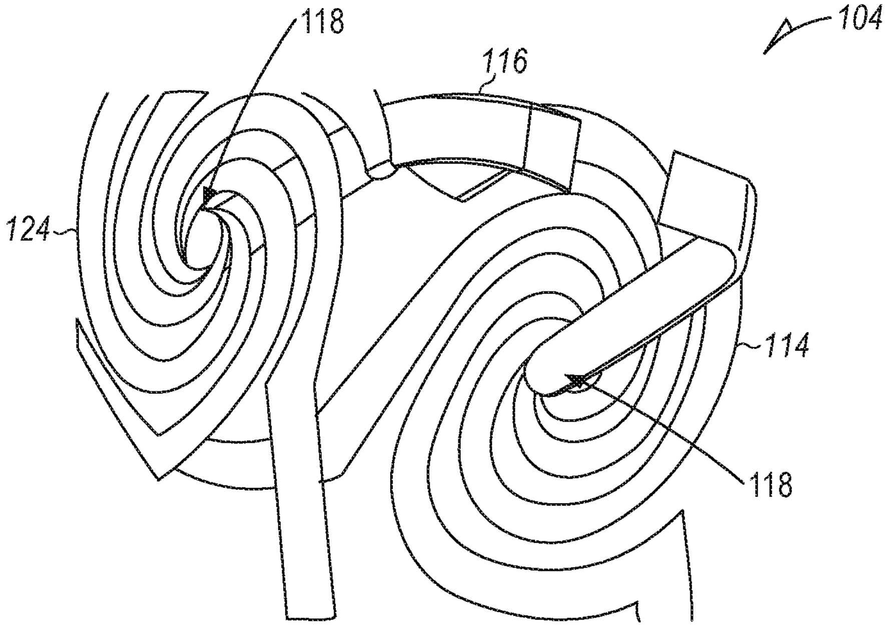

FIGS. 1B-1C illustrate a circular polarized spiral antenna 104, according to various embodiments of the present subject matter. In the depicted embodiment, the antenna 104 includes a first spiral portion 114 that is oriented in parallel, or approximately in parallel, with a second spiral portion 124. The spiral portions 114, 124 are connected to a transmission line 116 feed points 118 located at the center, or approximately at the center, of the spiral portions 114, 124. The antenna includes multiple portions, in various embodiments. The spiral antenna 104 is fed in the center to provide sufficient surface current components with an approximately 90-degree phase shift for both current and magnetic fields, thus providing two field components for the circular polarized antenna, in various embodiments.

Figure 2A:
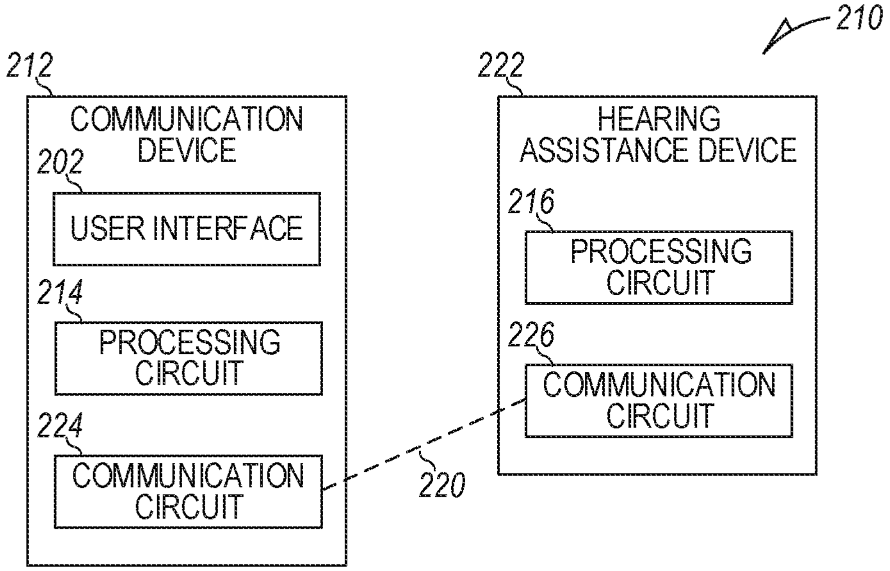
FIG. 2A illustrates a block diagram of a system for communication with a hearing assistance device, according to various embodiments of the present subject matter.

FIG. 2A illustrates a block diagram of a system for communicating with a hearing assistance device, according to various embodiments of the present subject matter. In the illustrated embodiment, system 210 includes a communication device 212, a hearing assistance device 222, and one or more communication links 220 providing for communication between one or more communication devices 212 and hearing assistance device 222. In various embodiments, communication device 212 and hearing assistance device 222 may each include one or more devices. For example, communication device 212 may include a smart phone, tablet, consumer electronic device, programmer, computer and/or a computer connected to a communicator, and hearing assistance device 222 may include a single device or a pair of devices such as a pair of left and right hearing aids. Communication link 220 may include one or more wired links or wireless links. In one embodiment, communication link 220 may include a Bluetooth™ or BLE wireless connection, but other communication protocols can be used without departing from the scope of the present subject matter.

In one example of wireless communications with a hearing assistance device, wearers of hearing assistance devices undergo a process called "fitting" to adjust the hearing assistance device to their particular hearing and use. In such fitting sessions a wearer may select one setting over another. Other types of selections include changes in level, which may be a preferred level. Hearing assistance device settings may be optimized for a wearer through a process of patient interview and device adjustment. One example of communication device 212 is a programmer that allows for programming of hearing assistance device 222. In various embodiments, a programmer may include a computer or other microprocessor-based device programmed to function as a programmer for hearing assistance device 222. Examples of such computer or other microprocessor-based device include a desktop computer, a laptop computer, a tablet computer, a handheld computer, and a cell phone such as a smart phone. Communication device 212 may include a user interface 202, a processing circuit 214, and a communication circuit 224. In various embodiments, user interface 202 includes a presentation device including at least a display screen and an input device. In various embodiments, the presentation device may also include various audial and/or visual indicators, and the user input device may include a computer mouse, a touchpad, a trackball, a joystick, a keyboard, and/or a keypad. In one embodiment, user interface 202 includes an interactive screen such as a touchscreen functioning as both the presentation device and the input device. Communication circuit 224 allows signals to be transmitted to and from hearing assistance device 222 via communication link 220. Hearing assistance device 222 includes a processing circuit 216 and a communication circuit 226. Communication circuit 226 allows signals to be transmitted to and from communication device 212 via communication link 220.

In various embodiments, the hearing assistance device 222 can wirelessly communicate with multiple different communication devices, such as communication device 212, using the antenna of the present subject matter. For example, the hearing assistance device 222 wirelessly communicates with a smart phone, a television, and/or other consumer electronic device, in various embodiments. The hearing assistance device 222 can be simultaneously wirelessly connected to multiple devices, in some embodiments. In various embodiments, some devices in wireless communication with the hearing assistance device 222 can be of different polarizations, as the antenna of the present subject matter provides for communication across polarization to different devices.

Figure 2B:
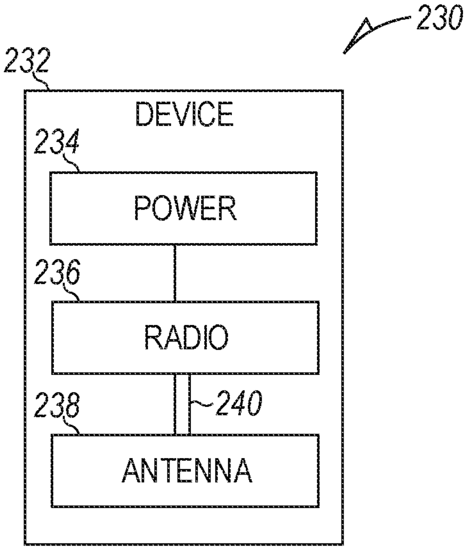
FIG. 2B illustrates a block diagram of a hearing assistance device including a circular polarized spiral antenna, according to various embodiments of the present subject matter.

FIG. 2B illustrates a block diagram of a hearing assistance device including a circular polarized spiral antenna, according to various embodiments of the present subject matter. In various embodiments, a hearing assistance device 230 includes a housing 232, a power source 234 within the housing, and a radio circuit 236 within the housing and electrically connected to the power source. A circular polarized spiral antenna 238 is provided within the housing in various embodiments, the antenna 238 configured to provide two electric field components configured to be used for wireless communications for the hearing assistance device. The device further includes a transmission line 240 connected to a center of a spiral of the antenna and configured to electrically connect to the radio circuit, according to various embodiments. In various embodiments, the antenna 238 includes two parallel spirals connected at their respective centers, as shown in FIG. 1C. Other numbers of spirals may be used without departing from the scope of the present subject matter.

According to various embodiments, the antenna is configured to provide an approximately 90-degree phase shift between the two electric field components. The circular polarized spiral antenna includes a circular polarized Fibonacci antenna, in various embodiments. In various embodiments, the two electric field components provide a first communication link and a second communication link.
The first communication link is configured to be used for wireless communications with an external device, and the second communication link is configured to be used for ear-to-ear communications with a second hearing assistance device, in some embodiments. The antenna of the present subject matter provides two magnetic field components to enable freedom of location for external communication devices communication with the hearing assistance device. For example, a hearing assistance device with the antenna of the present subject matter and the external communication device or devices experience less mismatch of polarization compared to an antenna with a single field component. In various embodiments, the hearing assistance device is wirelessly linked to a first external communication device (such as a smart phone) and has a second link to a second external communication device (such as a television streaming device), and these links may have different polarizations depending on the orientation of the external communication devices. In various embodiments, the wireless communications include communications at 2.4 GHz. The wireless communications include BLE communications, in various embodiments. According to various embodiments, the hearing assistance device includes a hearing aid, including but not limited to a behind-the-ear (BTE) hearing aid, an on-the-ear (OTE) hearing aid, an in-the-ear (ITE) hearing aid, a completely-in-the-canal (CIC) hearing aid or a receiver-in-canal (MC) hearing aid. In various embodiments, a first leg of a spiral antenna provides a first arm (or terminal), and a second leg of the spiral antenna provides a second arm (or terminal).

Figure 2C:
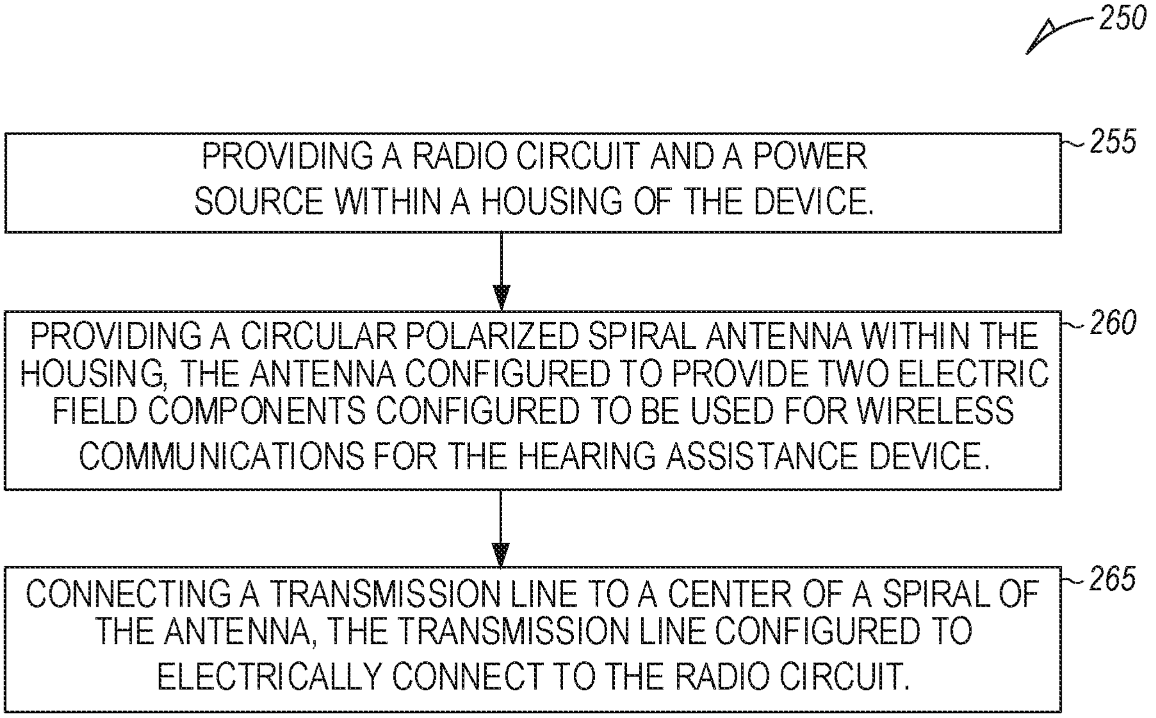
FIG. 2C illustrates a flow diagram of a method of forming a hearing assistance device, according to various embodiments of the present subject matter.

FIG. 2C illustrates a flow diagram of a method of forming a hearing assistance device, according to various embodiments of the present subject matter. The method 250 includes providing a radio circuit and a power source within a housing of the device, at step 255, and providing a circular polarized spiral antenna within the housing, at step 260. The antenna is configured to provide two electric field components configured to be used for wireless communications for the hearing assistance device. The method further includes connecting a transmission line to a center of a spiral of the antenna, at step 265, the transmission line configured to electrically connect to the radio circuit, in various embodiments.

According to various embodiments, the method further includes providing a second circular polarized spiral antenna within the housing, the second antenna aligned approximately in parallel with the antenna. The method further includes connecting the transmission line to a center of a spiral of the second antenna, in an embodiment. In various embodiments, the antenna is further configured to be used for wireless charging of the power source. In some embodiments, the antenna is configured for near-field wireless charging of the power source. The antenna is configured for far-field wireless charging of the power source, in other embodiments. The antenna is configured for wireless charging at 2.4 GHz and provides flexibility in charging orientation of the hearing assistance device with respect to a charger, in various embodiments. According to various embodiments, the spiral antenna may be formed using a laser direct structuring (LDS) manufacturing process. The spiral antenna may be formed using a stamp method, according to other embodiments. The spiral antenna is a flex type antenna, in various embodiments.

Figure 3:
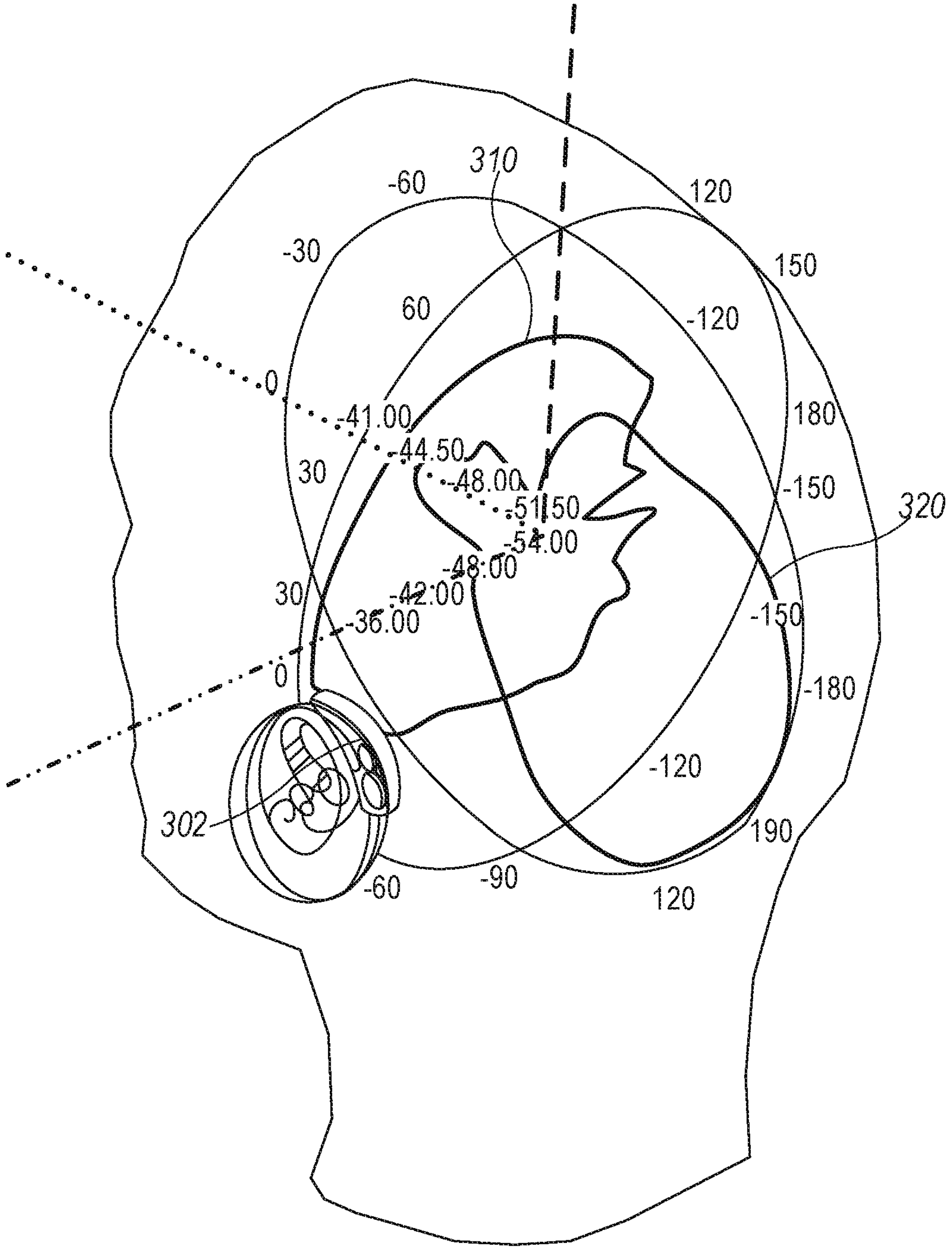
FIG. 3 illustrates a model of field components of a circular polarized spiral antenna for a hearing assistance device, according to various embodiments of the present subject matter.

FIG. 3 illustrates a model of field components of a circular polarized spiral antenna for a hearing assistance device 302, according to various embodiments of the present subject matter. In the depicted embodiment, a high frequency structural simulator (HFSS), such as by Ansys™, is used to simulate antenna output. The output provides circular polarization for two field components 310, 320 that are at approximately 90 degrees in orientation with respect to one another.

Figure 4:
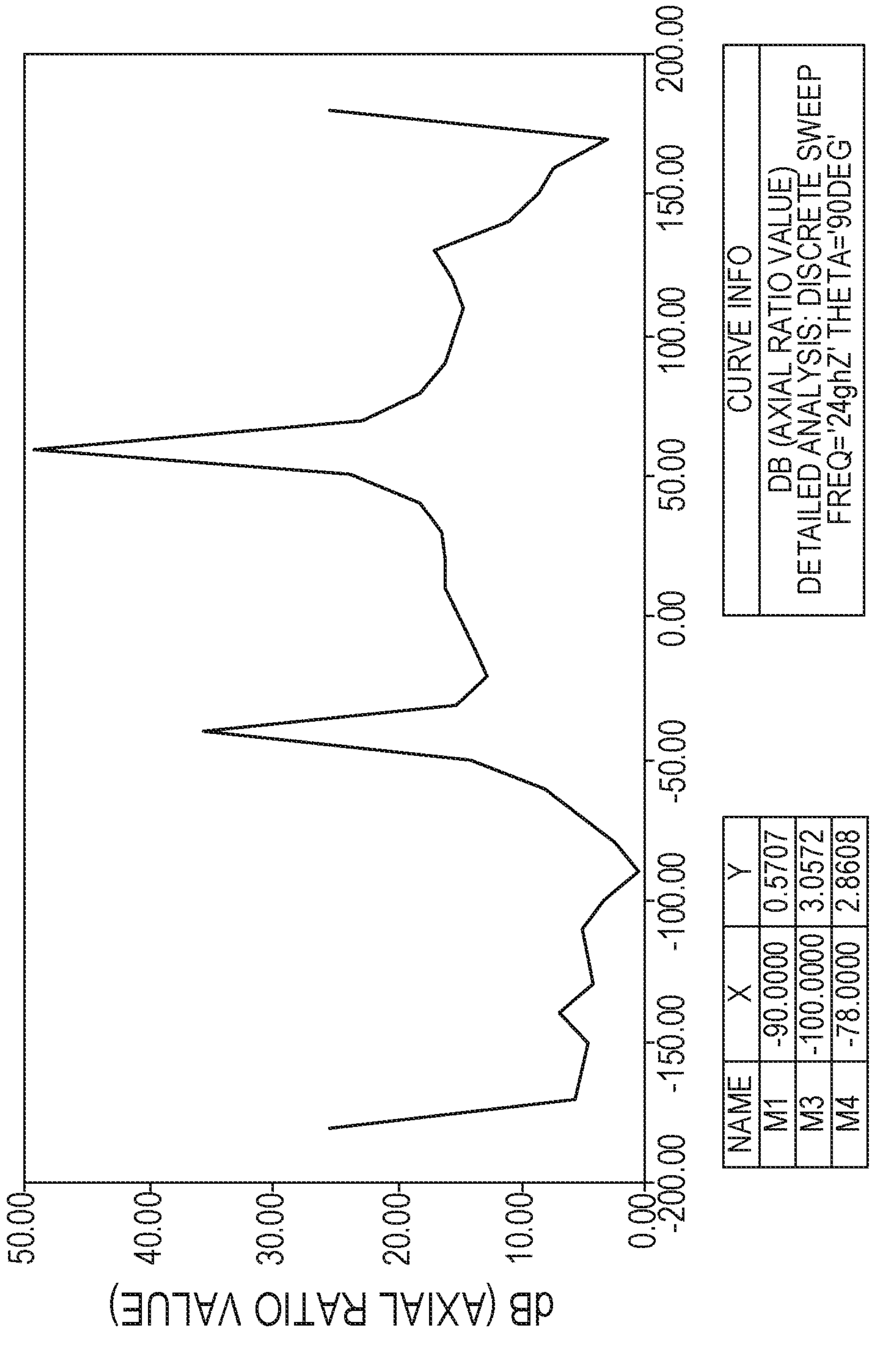
FIG. 4 illustrates a graphical diagram of an axial ratio (AR) response for a circular polarized spiral antenna for a hearing assistance device, according to various embodiments of the present subject matter.

FIG. 4 illustrates a graphical diagram of an axial ratio (AR) response for a circular polarized spiral antenna for a hearing assistance device, according to various embodiments of the present subject matter. The response output shows the AR of the antenna as simulated in FIG. 3 above. At an angle Phi=−90 degrees, or the direction of interest, the AR=0.57 dB with beam width of around 22 degrees, in one embodiment. In general, AR<−3 dB may be consider as a circular polarization for the spiral antenna of the present subject matter. In the table below, the spiral antenna of the present subject matter is measured without a matching network, and the listed measurements are performed on a phantom head. The antenna's total radiated power (TRP) has been measured at a far-field radiation chamber, and the results are shown below in Table 1.

TABLE 1

| Spiral antenna TRP measurements | | | | | |
|---|---|---|---|---|---|
| Frequency (MHz) | 2404 | 2420 | 2440 | 2460 | 2478 |
| Spiral antenna (dBm) | −16.29 | −17.91 | −19.01 | −16.22 | −14.71 |

Figure 5:
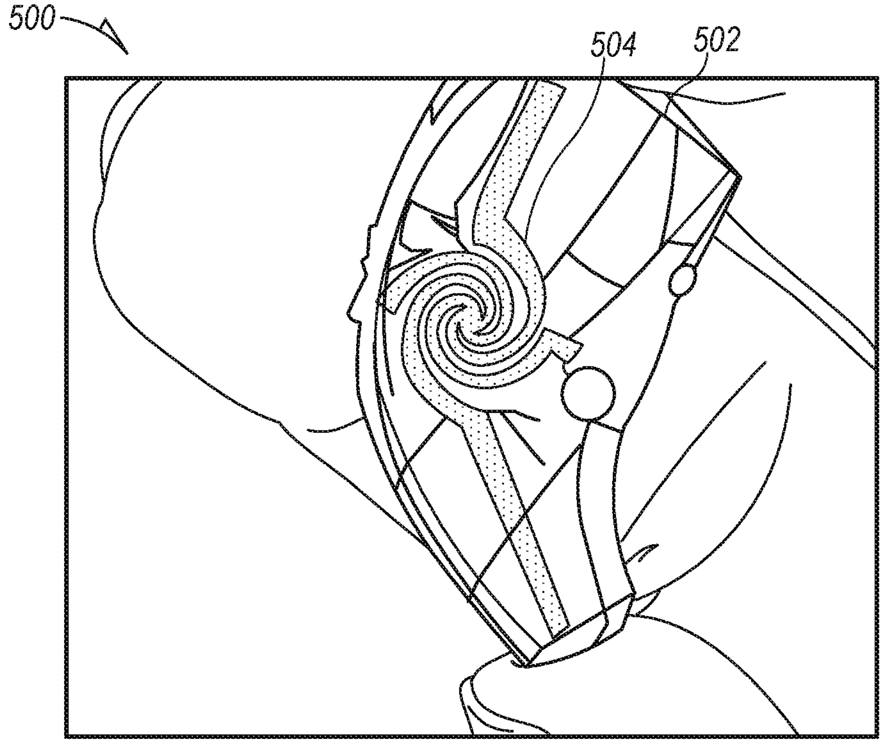
FIG. 5 illustrates a hearing assistance device including a circular polarized spiral antenna, according to various embodiments of the present subject matter.

FIG. 5 illustrates a hearing assistance device including a circular polarized spiral antenna, according to various embodiments of the present subject matter. The hearing assistance device 500 includes a circular polarized spiral antenna 504 within device housing 502. As stated above, circular polarized antenna 504 may also be located on a surface of the housing 502, integrated with the housing 102 or external to the housing 502, in various embodiments.

Benefits of the present subject matter include providing a reliable wireless link for hearing assistance device wireless communications, such as using BLE technology, and providing a wireless link resistant to orientation changes of the hearing devices and other devices in communications with the hearing devices. In various embodiments, the present subject matter provides two independent links for each polarization (vertical and horizontal) which may be used to establish two wireless links with the hearing assistance device, such as for ear-to-phone and ear-to-ear communications. In addition, the present subject matter may be used for wireless charging of a device power source, such as at 2.4 GHz, with improved bandwidth at multiple orientations.

Various embodiments of the present subject matter support wireless communications with a hearing assistance device. In various embodiments the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing assistance devices, including hearing assistance devices, including but not limited to, behind-the-ear (BTE), in-the-ear (ITE), in-the-canal (ITC), receiver-in-canal (MC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (MC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in devices whether such devices are standard or custom fit and whether they provide an open or an occlusive design. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing assistance device, comprising:

a housing;

a power source within the housing;

a radio circuit within the housing and electrically connected to the power source;

a circular polarized spiral antenna at least partially printed on a surface of the housing, the circular polarized spiral antenna including a first spiral portion and a second spiral portion, the first spiral portion aligned in parallel with the second spiral portion, wherein the circular polarized spiral antenna is configured to provide two electric field components configured to be used for wireless communications for the hearing assistance device; and a transmission line connected to a first feed point at a center of the first spiral portion and connected to a second feed point at a center of the second spiral portion, the transmission line configured to electrically connect to the radio circuit.

2. The device of claim 1, wherein the circular polarized spiral antenna is configured to provide a 90-degree phase shift between the two electric field components.

3. The device of claim 1, wherein the circular polarized spiral antenna includes a circular polarized Fibonacci antenna.

4. The device of claim 1, wherein the two electric field components provide a first communication link and a second communication link.

5. The device of claim 4, wherein the first communication link is configured to be used for wireless communications with an external device.

6. The device of claim 4, wherein the second communication link is configured to be used for ear-to-ear communications with a second hearing assistance device.

7. The device of claim 1, wherein the wireless communications include communications at 2.4 GHz.

8. The device of claim 1, wherein the wireless communications include Bluetooth™ Low Energy (BLE) communications.

9. The device of claim 1, wherein the hearing assistance device includes a hearing aid.

10. The device of claim 9, wherein the hearing aid includes a behind-the-ear (BTE) hearing aid.

11. The device of claim 9, wherein the hearing aid includes an on-the-ear (OTE) hearing aid.

12. The device of claim 9, wherein the hearing aid includes an in-the-ear (ITE) hearing aid.

13. The device of claim 9, wherein the hearing aid includes a completely-in-the-canal (CIC) hearing aid.

14. The device of claim 9, wherein the hearing aid includes a receiver-in-canal (RIC) hearing aid.

15. A method of forming a hearing assistance device, comprising:

providing a radio circuit and a power source within a housing of the device;

providing a circular polarized spiral antenna at least partially printed on a surface of the housing, the circular polarized spiral antenna including a first spiral portion and a second spiral portion, the first spiral portion aligned in parallel with the second spiral portion, wherein the circular polarized spiral antenna is configured to provide two electric field components configured to be used for wireless communications for the hearing assistance device; and connecting a transmission line to a first feed point at a center of the first spiral portion and to a second feed point at a center of the second spiral portion, the transmission line configured to electrically connect to the radio circuit.

16. The method of claim 15, wherein the circular polarized spiral antenna is configured to provide a 90-degree phase shift between the two electric field components.

17. The method of claim 16, wherein the two electric field components provide a first communication link and a second communication link.

18. The method of claim 15, wherein the circular polarized spiral antenna is further configured to be used for wireless charging of the power source.

19. The method of claim 18, wherein the circular polarized spiral antenna is configured for near-field wireless charging of the power source.

20. The method of claim 18, wherein the circular polarized spiral antenna is configured for far-field wireless charging of the power source.

* * * * *